United States Patent
Fukuda et al.

(10) Patent No.: US 7,599,087 B2
(45) Date of Patent: *Oct. 6, 2009

(54) METHOD AND APPARATUS FOR IMAGE PROCESSING, AND A COMPUTER PRODUCT

(75) Inventors: Hiroaki Fukuda, Kanagawa (JP); Yoshiyuki Namizuka, Kanagawa (JP); Shinya Miyazaki, Tokyo (JP); Sugitaka Oteki, Tokyo (JP); Takako Satoh, Kanagawa (JP); Rie Ishii, Tokyo (JP); Takeharu Tone, Tokyo (JP); Hiroyuki Kawamoto, Kanagawa (JP); Hideto Miyazaki, Kanagawa (JP); Fumio Yoshizawa, Kanagawa (JP); Yuji Takahashi, Kanagawa (JP); Yasuyuki Nomizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 644 days.

This patent is subject to a terminal disclaimer.

(21) Appl. No.: 11/197,352

(22) Filed: Aug. 5, 2005

(65) Prior Publication Data

US 2006/0028683 A1    Feb. 9, 2006

Related U.S. Application Data

(63) Continuation of application No. 09/735,649, filed on Dec. 14, 2000, now Pat. No. 6,954,281.

(30) Foreign Application Priority Data

Dec. 14, 1999    (JP)    ................. 11-353974

(51) Int. Cl.
*G06K 15/00*    (2006.01)
(52) U.S. Cl. ................. 358/1.16; 358/1.15; 358/426.08; 358/530; 358/426.01
(58) Field of Classification Search ................. 358/1.15, 358/1.16, 426.08, 530, 426.01
See application file for complete search history.

(56) References Cited

U.S. PATENT DOCUMENTS

| 5,361,370 | A |   | 11/1994 | Sprague et al. |
| 5,430,854 | A |   | 7/1995 | Sprague et al. |
| 5,522,080 | A | * | 5/1996 | Harney ................. 710/220 |
| 5,715,436 | A | * | 2/1998 | Kawai et al. ................. 345/505 |
| 5,926,644 | A |   | 7/1999 | Hays |
| 6,070,003 | A | * | 5/2000 | Gove et al. ................. 710/317 |

FOREIGN PATENT DOCUMENTS

JP    9-282305    10/1997

* cited by examiner

*Primary Examiner*—Twyler L. Haskins
*Assistant Examiner*—Michael Burleson
(74) *Attorney, Agent, or Firm*—Oblon, Spivak, McClelland, Maier & Neustadt, L.L.P.

(57) ABSTRACT

A programmable image processor capable of realizing a plurality of image formation operations is comprised of an SIMD type data operation processing section, RAMs, memory controllers, and memory switches. The memory controller and the memory switches selectively connect the plurality of RAMs to the data operation processing section thereby changing the memory capacity allotted to each image formation operation among a plurality of image formation operations.

16 Claims, 12 Drawing Sheets

FIG.6

| MODE | REGISTER 0 (R0) | REGISTER 1 (R1) | REGISTER 2 (R2) | REGISTER 3 (R3) | REGISTER 4 (R4) | REGISTER 5 (R5) |
|---|---|---|---|---|---|---|
| A | TWO RAMS NORMAL/TOGGLE | TWO RAMS NORMAL/TOGGLE | ONE RAM/TWO RAMS NORMAL/TOGGLE | ONE RAM/TWO RAMS NORMAL/TOGGLE | ONE RAM/TWO RAMS NORMAL/TOGGLE | ONE RAM/TWO RAMS NORMAL/TOGGLE |
| B | TWO RAMS NORMAL | ONE RAM NORMAL | — | ONE RAM NORMAL | ONE RAM/TWO RAMS NORMAL/TOGGLE | ONE RAM/TWO RAMS NORMAL/TOGGLE |
| C | TWO RAMS TOGGLE | — | — | — | ONE RAM/TWO RAMS NORMAL/TOGGLE | ONE RAM/TWO RAMS NORMAL/TOGGLE |
| D | THREE RAMS NORMAL | — | ONE RAM/TWO RAMS NORMAL/TOGGLE | ONE RAM/TWO RAMS NORMAL/TOGGLE | ONE RAM NORMAL | — |
| E | THREE RAMS NORMAL | ONE RAM NORMAL | — | ONE RAM NORMAL | ONE RAM NORMAL | — |
| F | THREE RAMS NORMAL | — | THREE RAMS NORMAL | — | — | — |
| G | THREE RAMS TOGGLE | — | — | — | — | — |

FIG.7

| REGISTER 0,2,4 (R0,R2,R4) | REGISTER 1,3,5 (R1,R3,R5) |
|---|---|
| ONE RAM NORMAL | ONE RAM NORMAL |
| ONE RAM TOGGLE | — |
| TWO RAMS NORMAL | — |

FIG.8

| MODE | REGISTER 6 (R6) | REGISTER 7 (R7) |
|---|---|---|
| H | ONE RAM NORMAL | ONE RAM NORMAL |
| I | ONE RAM TOGGLE | — |
| J | TWO RAMS NORMAL | — |

FIG.9

| MODE | INPUT/OUTPUT OF REGISTER 0 (R0) | INPUT/OUTPUT OF REGISTER 1 (R1) | INPUT/OUTPUT OF REGISTER 2 (R2) | INPUT/OUTPUT OF REGISTER 3 (R3) |
|---|---|---|---|---|
| K | LOWER 8 BITS OF DATA INPUT/ OUTPUT BUS 0 | UPPER 8 BITS OF DATA INPUT/ OUTPUT BUS 0 | LOWER 8 BITS OF DATA INPUT/ OUTPUT BUS 1 | UPPER 8 BITS OF DATA INPUT/ OUTPUT BUS 1 |
| L | LOWER 8 BITS OF DATA INPUT/ OUTPUT BUS 0 | UPPER 8 BITS OF DATA INPUT/OUTPUT BUS 0 | 16 BITS OF DATA INPUT/ OUTPUT BUS 1 | — |
| M | LOWER 8 BITS OF DATA INPUT/ OUTPUT BUS 0 | UPPER 8 BITS OF DATA INPUT/ OUTPUT BUS 0 | — | 16 BITS OF DATA INPUT/ OUTPUT BUS 1 |
| N | 16 BITS OF DATA INPUT/ OUTPUT BUS 0 | — | LOWER 8 BITS OF DATA INPUT/ OUTPUT BUS 1 | UPPER 8 BITS OF DATA INPUT/ OUTPUT BUS 1 |
| O | 16 BITS OF DATA INPUT/ OUTPUT BUS 0 | — | 16 BITS OF DATA INPUT/ OUTPUT BUS 1 | — |
| P | 16 BITS OF DATA INPUT/ OUTPUT BUS 0 | — | — | 16 BITS OF DATA INPUT/ OUTPUT BUS 1 |
| Q | — | 16 BITS OF DATA INPUT/ OUTPUT BUS 0 | LOWER 8 BITS OF DATA INPUT/ OUTPUT BUS 1 | UPPER 8 BITS OF DATA INPUT/ OUTPUT BUS 1 |
| R | — | 16 BITS OF DATA INPUT/ OUTPUT BUS 0 | 16 BITS OF DATA INPUT/ OUTPUT BUS 1 | — |
| S | — | 16 BITS OF DATA INPUT/ OUTPUT BUS 0 | — | 16 BITS OF DATA INPUT/ OUTPUT BUS 1 |
| T | 32 BITS OF DATA INPUT/ OUTPUT BUSES 0 AND 1 | — | — | — |
| U | — | 32 BITS OF DATA INPUT/ OUTPUT BUSES 0 AND 1 | — | — |

FIG.10

| MODE | INPUT/OUTPUT OF REGISTER 4 (R4) | INPUT/OUTPUT OF REGISTER 5 (R5) |
|---|---|---|
| V | LOWER 8 BITS OF DATA INPUT/ OUTPUT BUS 2 | UPPER 8 BITS OF DATA INPUT/ OUTPUT BUS 2 |
| W | 16 BITS OF DATA INPUT/ OUTPUT BUS 2 | — |
| X | — | 16 BITS OF DATA INPUT OUTPUT BUS 2 |

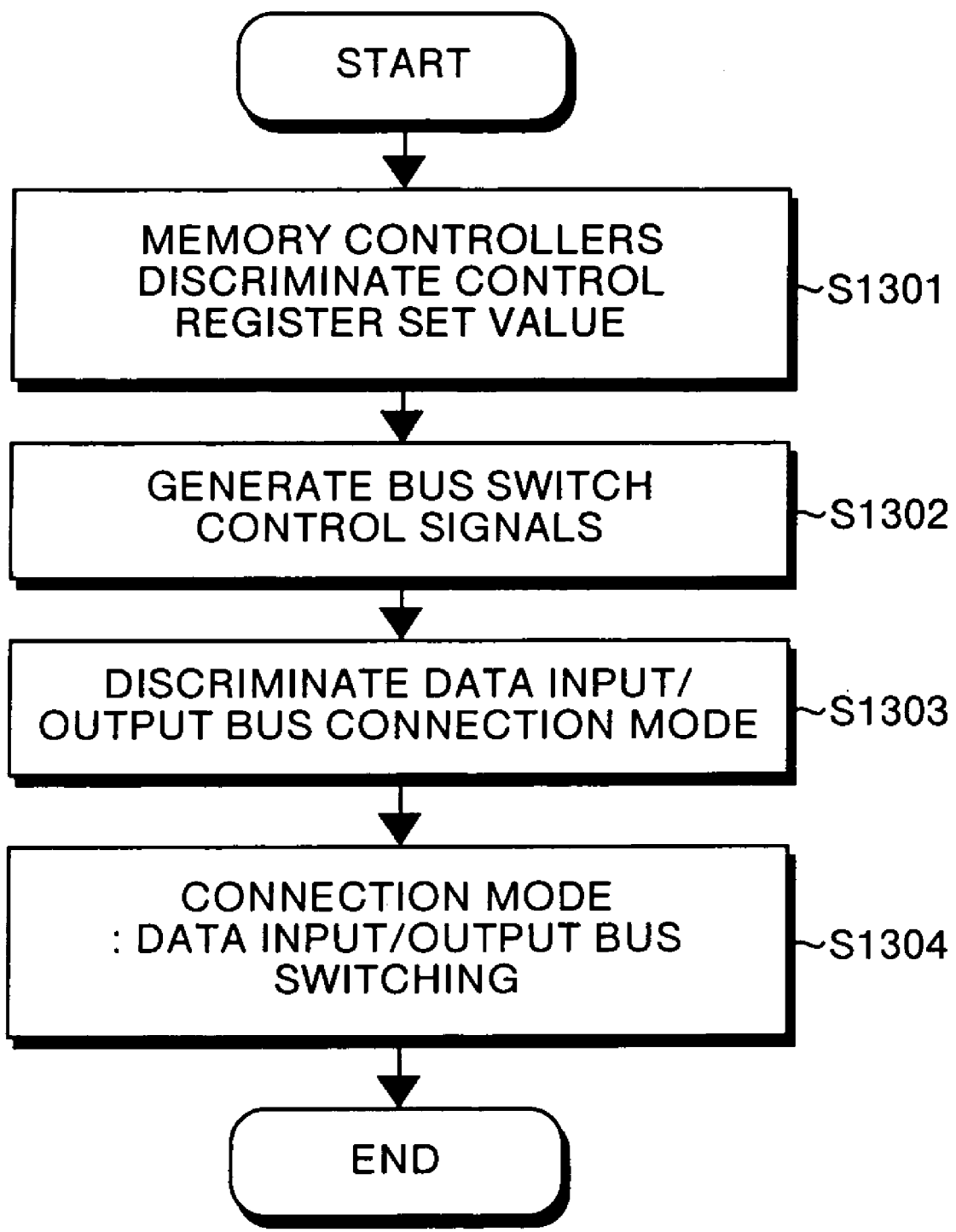

METHOD AND APPARATUS FOR IMAGE PROCESSING, AND A COMPUTER PRODUCT

CROSS-REFERENCE TO RELATED APPLICATIONS

This application is a continuation application of, and claims priority to, Ser. No. 09/735,649 filed on Dec. 14, 2000 and claims priority to Japanese patent No. 11-353974, filed on Dec. 14, 1999.

FIELD OF THE INVENTION

The present invention relates to a technology for outputting digital images.

BACKGROUND OF THE INVENTION

At present, there exists an image processing apparatus or a so-called MFP (Multi-Function printer) constituted as a combined machine of image processing apparatuses such as a copying machine, a facsimile machine, a printer, a scanner and the like. A combination of an SIMD (Single Instruction stream Multiple Data stream) type operation processing section and an auxiliary operation processing section are employed for the image processing section of such an MFP, thereby realizing a high speed, programmable image processing, which technique is disclosed by Japanese Patent Application Laid-Open (JP-A) No. 9-282395.

Although the image processing apparatus according to the conventional technique can properly use the SIMD type operation processing section and other operation processing sections depending on the content of the image processing, memory capacity used for an operation processing and the data width of input/output data cannot be properly changed according to the content of the image processing. Because of such a drawback, there is still much room for improvement to effectively utilize the resource of an image processing apparatus if a plurality of image formation processings are simultaneously realized.

Namely, if different image formation operations such as a copying operation and a facsimile operation are carried out simultaneously, it possibly happens that memories are scant for an operation mode requiring a higher memory capacity and unnecessarily sufficient for an operation mode requiring a relatively low memory capacity among a plurality of image formation operations (operation modes).

Further, if conducting different operation modes simultaneously, it possibly happens that sufficient data transfer speed cannot be ensured for an operation mode requiring a larger data transfer width among the plural operation modes and that data is transferred at unnecessarily high speed for an operation mode requiring a relatively small data transfer width.

SUMMARY OF THE INVENTION

It is an object of the present invention to provide an image processing apparatus and an image processing method, capable of effectively utilizing the resource of a multifunctional image processing apparatus and capable of optimally controlling an overall system by flexibly corresponding to a data format in each operation mode among a plurality of operation modes. It is another object of this invention to provide a computer readable recording medium that stores a computer program which when executed realizes the method according to the present invention.

The image processing apparatus according to one aspect of this invention comprises a programmable image processing unit for processing image data as a visualized image, the image data represented by a digital signal generated based on an image, and for allowing realizing a plurality of image formation operations; an image data storage management unit for managing, en block, access to an image data storage section storing the image data; and an image data transmission management unit for managing, en block, transmission of the image data between a data bus transmitting the image data and a processing unit used for an image processing conducted by the image processing unit. The image processing unit comprises a SIMD type data operation unit; a plurality of memories used for the image processing conducted by the SIMD type data operation unit; a memory controller controlling the plurality of memories; a memory switch controlling connection of the plurality of memories; a plurality of data buses for inputting and outputting the image data; a bus switch controlling connection between the plurality of data buses and the data operation unit; and an auxiliary operation unit for assisting in the data operation unit.

According to the above invention, the image processing unit is provided with the SIMD type data operation unit which can simultaneously execute image processing with respect to a plurality of items of data.

Further, it is preferable that the memory controller and the memory switch selectively switch over the plurality of memories with respect to the data operation unit, and change a memory capacity allotted to each image formation operation among the plurality of image formation operations. As a result, memory capacity used can be-changed for every image formation operation conducted by the image processing apparatus.

Further, it is preferable that the memory controller and the memory switch control the plurality of data buses, and change an image data transfer width allotted to each image formation operation among the plurality of image formation operations. As a result, image data transfer width can be changed for every image formation operation conducted by the image processing apparatus.

Further, it is preferable that at least one of the auxiliary operation unit has a non-SIMD type constitution for executing a consecutive operation processing. As a result, the SIMD type operation unit and the non-SIMD type operation unit can be provided in the same image processing apparatus.

The image processing method according to another aspect of this invention comprises a capacity change step of selectively connecting the plurality of memories to the data operation unit by using the memory controller and the memory switch, and of changing a memory capacity allotted to each image formation operation among the plurality of image formation operations. As a result, the SIMD type data operation unit which can simultaneously execute image processing with respect to a plurality of items of data. In addition, memory capacity to be used can be changed for every image formation operation conducted by the image processing apparatus.

The image processing method according to still another aspect of this invention comprises a data bus width change step of controlling the plurality of data buses and the plurality of memories by using the memory controller and the bus switch, and of changing an image data transfer width allotted to each image formation operation among the plurality of image formation operations. As a result, the SIMD type data operation unit which can simultaneously execute image processing with respect to a plurality of items of data. In addition, image data transfer width can be changed for every image formation operation conducted by the image processing apparatus.

The recording medium according to still another aspect of this invention records a computer program allowing a computer to execute the method according to the present invention. As a result, the method according to the present invention can be easily and automatically realized using the computer.

Other objects and features of this invention will become apparent from the following description with reference to the accompanying drawings.

BRIEF DESCRIPTION OF THE DRAWINGS

FIG. 6 is an explanatory view showing combinations of the RAM connection modes of memory switches shown in FIG. 3;

FIG. 7 is an explanatory view showing combinations of methods for accessing RAM's shown in FIG. 6;

FIG. 8 is an explanatory view showing the RAM connection modes of the other memory switch shown in FIG. 3;

FIG. 9 is an explanatory view showing the data bus connection modes of bus switches shown in FIG. 3;

FIG. 10 is an explanatory view showing the data bus connection modes of the other bus switch shown in FIG. 3;

FIG. 13 is a flow chart describing more concretely data input/output bus connection processings conducted by the memory controllers and the bus switches in the image processing method in the embodiment according to the present invention.

DESCRIPTION OF THE PREFERRED EMBODIMENTS

Preferred embodiment of an image processing apparatus, an image processing method and a computer readable recording medium recording a program for allowing a computer to execute the image processing method according to the present invention will be described hereinafter with reference to the accompanying drawings.

Figure 1:
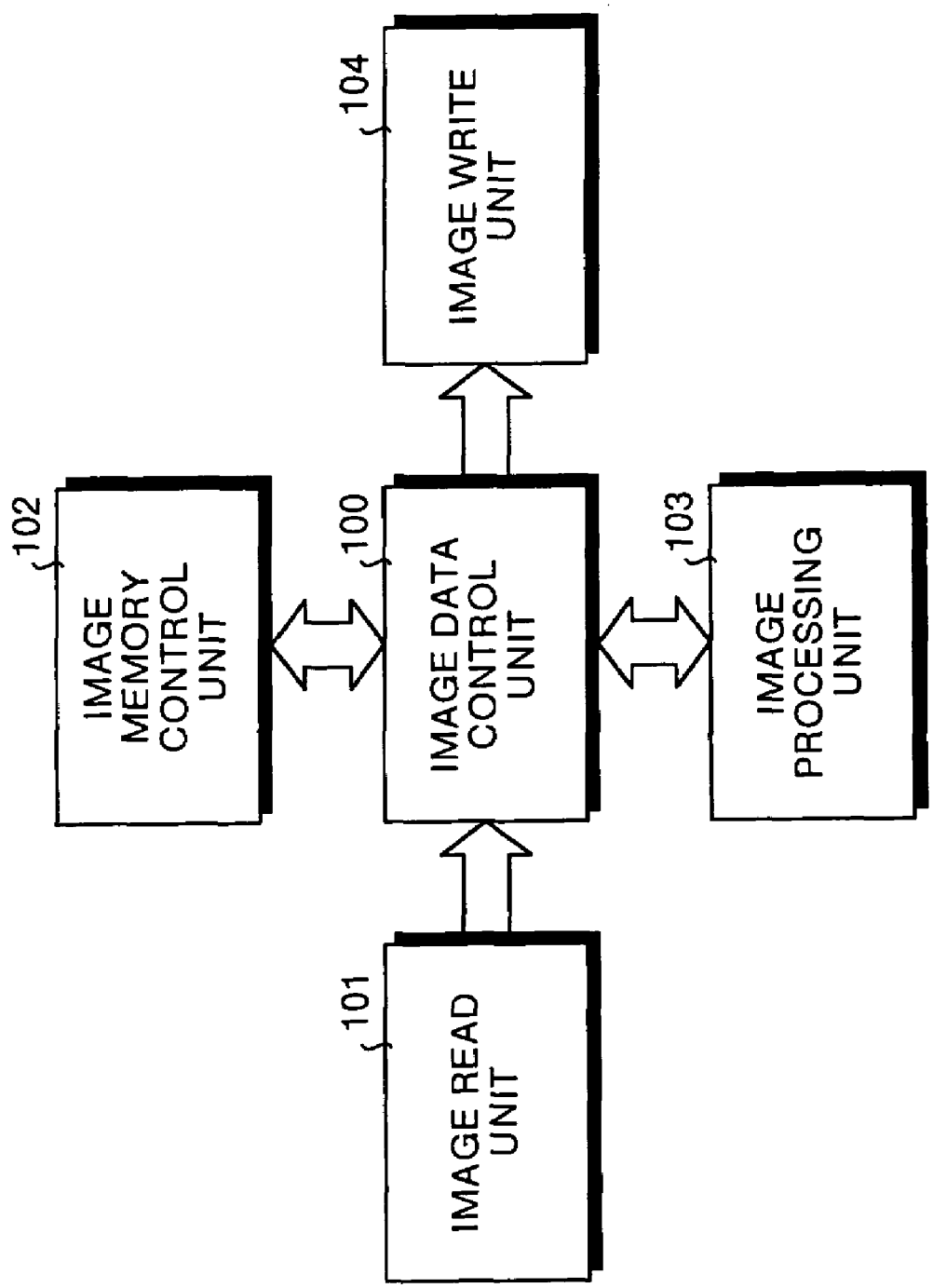
FIG. 1 is a functional block diagram showing the constitution of an image processing apparatus in one embodiment according to the present invention.

First, the principle of an image processing apparatus in this embodiment will be described. FIG. 1 is a functional block diagram showing the constitution of the image processing apparatus in this embodiment. As shown in FIG. 1, the image processing apparatus consists of five units.

These five units are as follows. That is, an image data control unit 100, an image reading unit 101 reading image data, an image memory control unit 102 controlling an image memory storing images and writing/reading the image data, an image processing unit 103 conducting an image processing such as treatment and edition to the image data, and an image write unit 104 writing the image data onto transfer paper or the like.

These units stated above are constituted while centering around the image data control unit 100. Namely, the image reading unit 101, the image memory control unit 102, the image processing unit 103 and the image write unit 104 are connected to the image data control unit 100. Now, these units will be described one by one.

Image Data Control Unit 100:

The image data control unit 100 conducts the following processings:
  (1) A data compression processing (primary compression) for improving data bus transfer efficiency.
  (2) A transfer processing for transferring primary compressed data to image data.
  (3) An image synthesis processing (which can synthesize image data from a plurality of units and includes synthesis on data buses).
  (4) An image shift processing (which shifts an image in main scan direction and sub-scan direction).
  (5) An image region expansion processing (which can expand an image region toward peripheral portions by an arbitrary quantity).
  (6) An image variable power rate processing (e.g., 50% or 200% fixed variable power rate).
  (7) A parallel bus interface processing.
  (8) A serial bus interface processing (for an interface with a process controller 211 which will be described later).
  (9) A format conversion processing for parallel data and serial data.
  (10) An interface processing for an interface with the image reading unit 101.
  (11) An interface processing for an interface with the image processing unit 103.

Image Reading Unit 101:

The image reading unit. 101 conducts the following processings:
  (1) An original reflection light read processing by means of an optical system.
  (2) A conversion processing for conversion to an electric signal by means of a CCD (Charge Coupled Device).
  (3) A digitization processing by means of an A/D converter.
  (4) A shading correction processing (for correcting the illumination distribution irregularity of a light source).
  (5) A scanner γ correction processing (for correcting the density characteristic of a read system).

Image Memory Control Unit 102:

The image memory control unit 102 conducts the following processings:
  (1) An interface control processing for an interface with a system controller.
  (2) A parallel bus control processing (which is an interface control processing for an interface with a parallel bus)
  (3) A network control processing.
  (4) A serial bus control processing (for controlling a plurality of external serial ports).

(5) An internal bus interface control processing (which is a command control processing with an operation section)
(6) A local bus control processing (which is an ROM, RAM, font data access control processing for starting the system controller).
(7) A memory module operation control processing (such as a memory module write/read control processing).
(8) A memory module access control processing (for arbitrating memory access requests from a plurality of units).
(9) A data compression/expansion processing (for reducing data quantity to effectively utilize memories).
(10) An image edition processing (such as a memory region data clearing processing, an image data rotation processing and an image synthesis processing on the memories).

(Image Processing Unit 103:

The image processing unit 103 conducts the following processings:
(1) A shading correction processing (for correcting the illumination distribution irregularity of the light source).
(2) A scanner γ correction processing (for correcting the density characteristic of the read system).
(3) An MTF correction processing.
(4) A smoothing processing.
(5) An arbitrary variable power rate processing in main scan direction.
(6) A density conversion processing (γ conversion processing: corresponding to density notch).
(7) A simple multilevel conversion processing.
(8) A simple binarization processing.
(9) An error diffusion processing.
(10) A dither processing.
(11) A dot arrangement phase control processing (for right-of-center dots, left-of-center dots).
(12) An isolated point removal processing.
(13) An image region separation processing (color judgment, attribute judgment, adaptation processing).
(14) A density conversion processing.

Image Write Unit 104:

The image write unit 104 conducts the following processings:
(1) Edge smoothing processing (jaggy correction processing).
(2) A correction processing for dot rearrangement.
(3) An image signal pulse control processing.
(4) A format conversion processing for parallel data and serial data.

Figure 2:
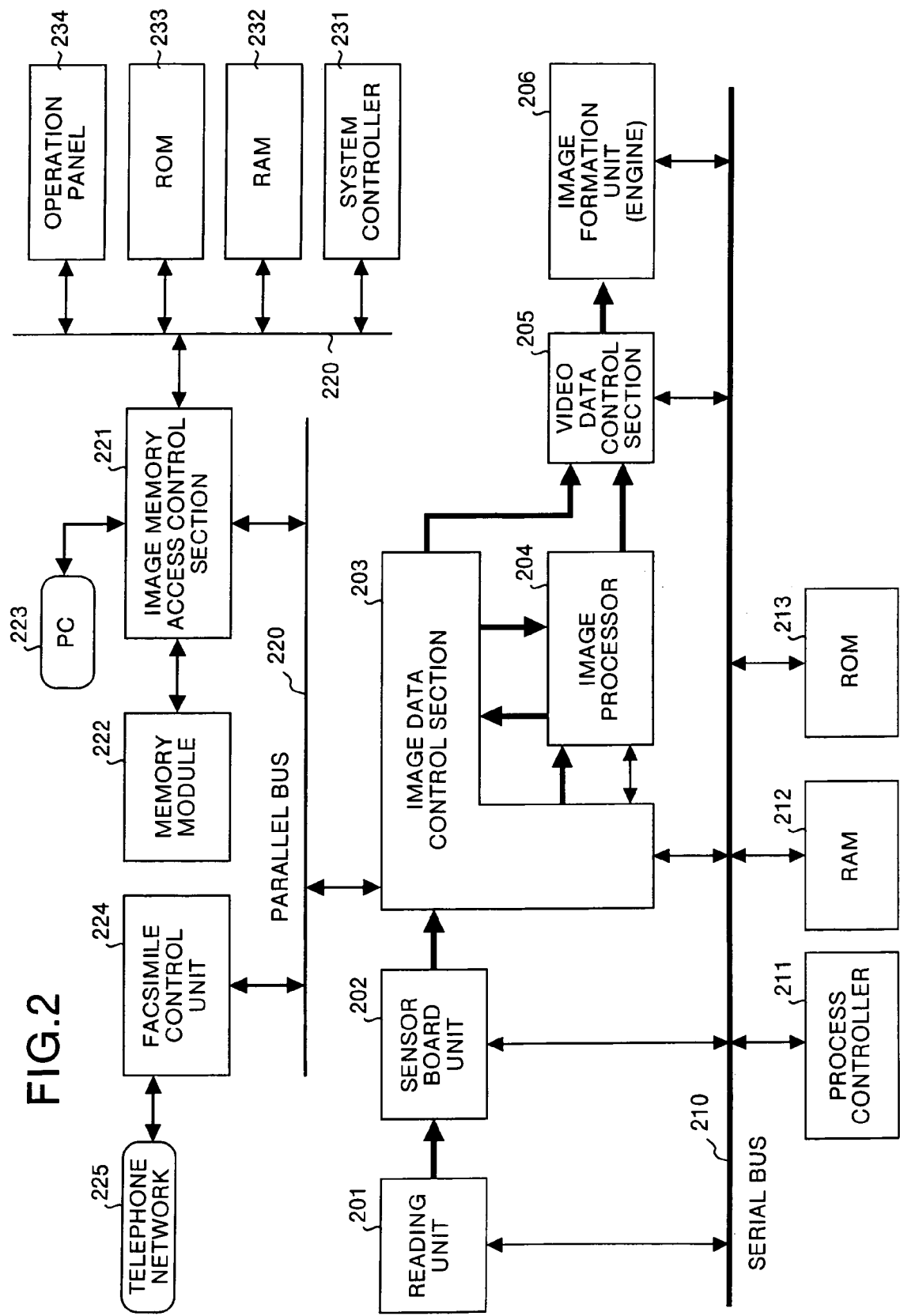
FIG. 2 is a block diagram showing one example of the hardware constitution of the image processing apparatus in the embodiment according to the present invention.

Hardware Constitution of Digital Combined Machine:

Hardware constitution the image processing apparatus in this embodiment, considering that the image processing apparatus is a digital combined machine, will now be explained. FIG. 2 is a block diagram showing one example of the hardware constitution of the image processing apparatus in this embodiment.

In the block diagram of FIG. 2, the image-processing apparatus in this embodiment is provided with a reading unit 201, a sensor board unit 202, an image data control section 203, an image processor 204, a video data control section 205 and an image formation unit (engine) 206. The image processing apparatus in this embodiment is also provided with a process controller 211, an RAM 212 and an ROM 213 through a serial bus 210.

Among the constituent elements stated above, the image processor 204 is a programmable image processing unit which processes image data which is a digital signal generated based on an image so as to output the image data as a visualized image, and which can realize a plurality of image formation operations. The image data control section 203 is an image data transmission management unit which manages, en block, the transmission of image data between data buses for transmitting the image data and the processing unit used for image processing conducted by the image processor 204. Since the present invention relates to the image processor 204, the constitution of the image processor 204 will be described in detail with reference to FIG. 3 and the following.

Further, the image processing apparatus in this embodiment is provided with an image memory access control section 221 and a facsimile control unit 224 through a parallel bus 220. In addition, the image processing apparatus is provided with a memory module 222 connected to the image memory access control section 221, a system controller 231, an RAM 232, an ROM 233 and an operation panel 234. Among these constituent elements, the image memory access control section 221 and the memory module 222 serve as an image data storage management unit for managing, en block, access to the RAM 212 and ROM 213 for image data.

The relationships among the above-stated constituent elements and the units 100 to 104 shown in FIG. 1 will be described. Namely, the reading unit 201 and the sensor board unit 202 realize the functions of the image reading unit 101 shown in FIG. 1. Likewise, the image data control section 203 realizes the functions of the image data control unit 100. Also, the image processor 204 realizes the functions of the image processing unit 103.

Furthermore, the video data control section 205 and the image formation unit (engine) 206 realizes the functions of the image write unit 104. The image memory access control section 221 and the memory module 222 realize the functions of the image memory control unit 102.

Next, the contents of the respective constituent elements will be described. The reading unit 201 optically reading an original consists of a lamp, a mirror and a lens, and converges the reflection light of the light of the lamp applied to the original onto a light receiving element by the mirror and the lens.

The light receiving element, e.g., a CCD is mounted on the sensor board unit 202. Image data converted into an electric signal by the CCD is further converted into a digital signal and outputted (transmitted) from the sensor board unit 202.

The image data outputted (transmitted) from the sensor board unit 202 is inputted (received) by the image data control section 203. The transmission of the image data between the functional device (or processing unit) and the data buses is controlled by the image control section 203.

The image control section 203 transfers image data among the sensor board unit 202, the parallel bus 220 and the image processor 204, and establishes communication between the process controller 211 and the system controller 231 responsible for entire control over the image processing apparatus with respect to image data. The RAM 212 is used as the work area of the process controller 211 and the ROM 213 stores the boot program of the process controller 211 and the like.

The image data outputted (transmitted) from the sensor board unit 202 is transferred (transmitted) to the image processor 204 through the image data control section 203. After the signal deterioration at the optical system and that caused by quantization to a digital signal (which deterioration is at the scanner system) are corrected, the image data is outputted (transmitted) again to the image data control section 203.

The image memory access control section 221 controls the write/read of the image data to/from the memory module 222. In addition, the section 221 controls the operations of the respective constituent elements connected to the parallel bus 220. The RAM 232 is used as the work area of the system controller 231 and the ROM 233 stores the boot program of the system controller 231 and the like.

The operation panel 234 inputs an processing to be conducted by the image processing apparatus. For example, the panel 234 inputs a processing type (e.g., copying, facsimile transmission, image read or printing), the number of times of processings and the like. By doing so, it is possible to input image data control information. The detail of the facsimile control unit 224 will be described later.

Next, as the image data thus read, there are a job stored in the memory module 222 and reused and a job which is not stored in the memory module 222, each of which cases will be described. To store a job in the memory module 222, there is, for example, a method including operating the reading unit 201 only once, storing the image data read by the reading unit 201 in the memory module 222 and reading the stored image data a plurality of times when copying one original a plurality of times.

As an example in which the memory module 222 is not used, when copying one original only once, the image data read may be reproduced as it is. Therefore, it is not necessary for the image memory access control section 221 to access the memory module 222.

First, if the memory module 222 is not used, the data transferred from the image processor 204 to the image data control section 203 is returned again from the image data control section 203 to the image processor 204. The image processor 204 conducts an image quality processing for converting brightness data at the CCD in the sensor board unit 202 into area gradation.

The image data which has been subjected to the image quality processing is transferred from the image processor 204 to the video data control section 205. The video data control section 205 conducts pulse control to the signal which image data has been converted into the area gradation so as to conduct a post-processing on the arrangement of dots and to reproduce the dots. Thereafter, the image formation unit 206 forms a reproduced image on the transfer paper.

Next, description will be given to additional processings conducted when reading the image stored in the memory module 222, e.g., an image data flow in case of conducting the rotation of image direction and image synthesis. The image data transferred from the image processor 204 to the image data control section 203 is fed to the image memory access control section 221 through the parallel bus 220 from the image data control section 203.

The image memory access control section 221 controls access to the image data and the memory module 222, develops data for the printing of the external PC (personal computer) 223 and compresses/expands image data for effectively utilizing the memory module 222 based on the control of the system control 231.

The image data fed to the image memory access control section 221 is compressed and then stored in the memory module 222. The stored image data is read at need. The read image data is expanded back to the original image data and returned from the image memory access control section 221 to the image data control section 203 through the parallel bus 220.

After transferring the image data from the image data control section 203 to the image processor 204, an image quality processing is conducted and pulse control is conducted to the image data by the data control section 205. Then, the image formation unit 206 forms a reproduced image on the transfer paper.

In the image data flow, the parallel bus 220 and the image data control section 203 control the bus, thereby realizing the functions of a digital combined machine. A facsimile transmission function allows the image processor 204 to conduct an image processing to the image data thus read and transfer the resultant image data to the facsimile control unit 224 through the image data control section 203 and the parallel bus 220. The facsimile control unit 224 converts data for a communication network and transmits the converted data to a telephone network 225 as facsimile data.

On the other hand, received facsimile data and line data from the telephone network 225 are converted into image data by the facsimile control unit 224 and transferred to the image processor 204 through the parallel bus 220 and the image data control section 203. In this case, no image processing is particularly conducted to the image data and the video data control section 205 rearranges dots and controls pulses, and the image formation unit 206 forms a reproduced image on the transfer paper.

If a plurality of jobs, e.g., a copying function, a facsimile transmission and reception function and a printer output function are carried out simultaneously, the system controller 231 and the process controller 211 control the allotment of the right to use the reading unit 201, the image formation unit 206 and the parallel bus 220 to the jobs.

The process controller 211 controls the flow of image data while the system controller 231 controls the entire system and manages the starting of the respective resources. Further, to select the function of the digital combined machine, the operation panel (or operation section) 234 inputs the selected function and sets a processing content such as a copying function or a facsimile function.

The system controller 231 and the process controller 211 communicate with each other through the parallel bus 220, the image data control section 203 and the serial bus 210. To be specific, the image data control section 203 conducts data format conversion for a data interface between the parallel bus 220 and the serial bus 210, thereby establishing communication between the system controller 231 and the process controller 211.

Figure 3:
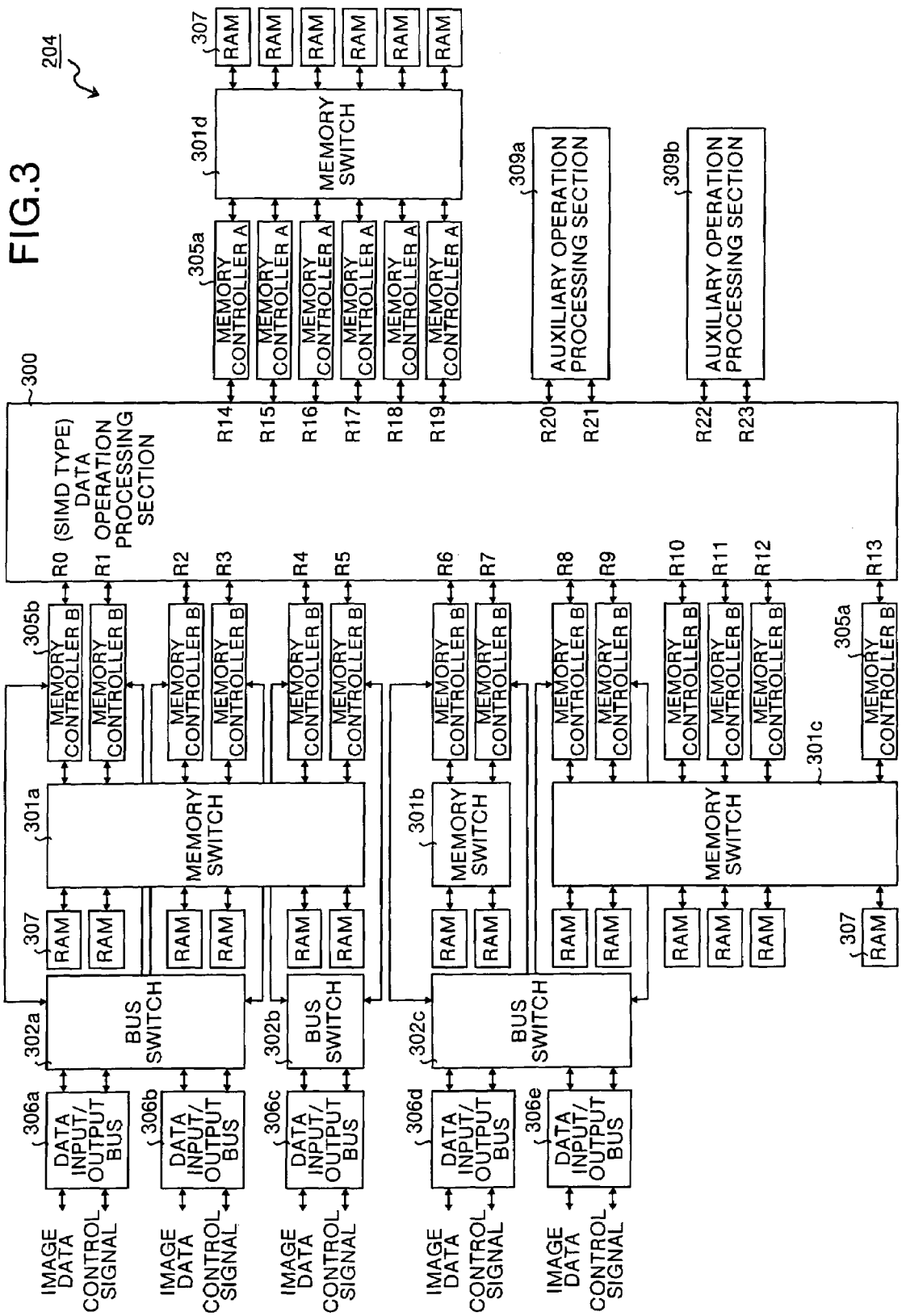
FIG. 3 is an explanatory view for the constitution of an image processor in the embodiment according to the present invention.
Figure 4:
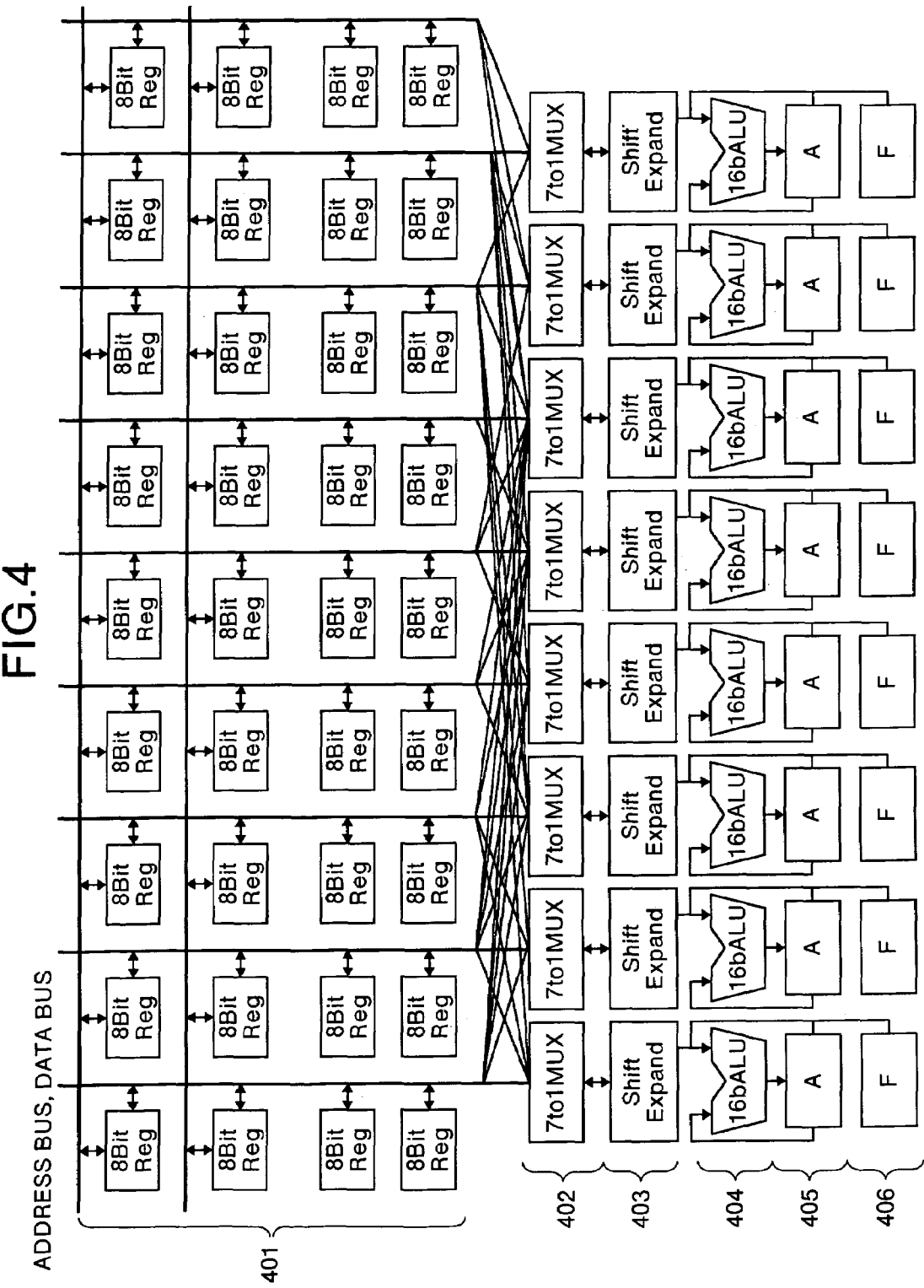
FIG. 4 is an explanatory view showing the constitution of an ordinary SIMD type operation processing apparatus.

FIG. 3 is an explanatory view for the constitution of the image processor 204 according to the present invention. The image processor 204 shown in FIG. 3 has an SIMD type data operation processing section 300. The SIMD type is for simultaneously executing a single command to a plurality of items of data and consists of a plurality of PE (or processor elements). FIG. 4 shows a schematic diagram of the SIMD type processor, which will be described hereinafter.

As shown in FIG. 4, the SIMD type processor has a plurality of PE's each of which consists of registers (Reg) 401 storing data, a multiplexer (MUX) 402 for accessing the registers of other PE's, a parallel shifter (Shift Expand) 403, a logic operation unit (ALU) 404, an accumulator (A) 405 storing a logical result, and a temporary register (F) 406 temporarily storing the content of the accumulator 405.

Each register 401 is connected to an address bus and a data bus (i.e., a lead line and a word line) and stores command codes for specifying processings and processing target data. The contents of the registers 401 are inputted into the corresponding logic operation units 404 and the operation results are stored in the accumulators 405. To be fetched externally of the PE's, the operation results are temporarily stored in the corresponding temporary registers 406. By fetching the contents of the temporary registers 406, it is possible to obtain the processing results for the processing targets data.

The command code of the same content is fed to the respective PE's, the processing target data is fed to the PE's in different states and the contents of the adjacent PE registers 401 are referred to by the multiplexers 402, whereby the operation results are outputted to the respective accumulators 405.

For example, if the content of one line of the image data is arranged at the PE's for each pixel and subjected to an operation processing with the same command code, then it is possible to obtain the processing result of one line at shorter time than that required for consecutively processing pixels one by one. A spatial filter processing and a shading correction processing can be, in particular, executed to all the PE's in common by using an operation expression itself as a command code for the respective PE's.

In FIG. 3, the image processor 204 is also provided with a plurality of memories or RAM's 307 used for an image processing conducted by the SIMD type data operation processing section 300 stated above, memory controllers 305a (which are referred to as "memory controller A" in FIG. 3) controlling each of the RAM's 307, memory controllers 305b (which are referred to as "memory controller B" in FIG. 3) memory switches 301a, 301b, 301c and 301d controlling the connection of the RAM's 307, data input/output buses 306a, 306b, 306c, 306d and 306e inputting/outputting image data to/from the image processor 204, and bus switches 302a, 302b and 302c controlling the connection between the data input/output buses 306a, 306b, 306c, 306d and 306e and the data operation processing section 300.

It is noted that not only image data but also a control signal transmitted and received to and from the image data control section 203 are inputted/outputted to/from the data input/output buses 306a, 306b, 306c, 306d and 306e.

Further, the image processor 204 is provided with auxiliary operation processing sections 309a and 309b assisting in the data operation processing section 300. At least one of the auxiliary operation processing sections 309a and 309b is of non-SIMD type for executing a consecutive operation processing. The non-SIMD type auxiliary operation processing sections 309a and 309b are constituted to conduct an image processing which is disadvantageous to the SIMD type data operation processing section 300 in terms of processing time and the number of steps, e.g., a processing for controlling a plurality of peripheral pixel patterns relative to a noted pixel and matching the peripheral pixel patterns to the noted pixel.

Figure 5:
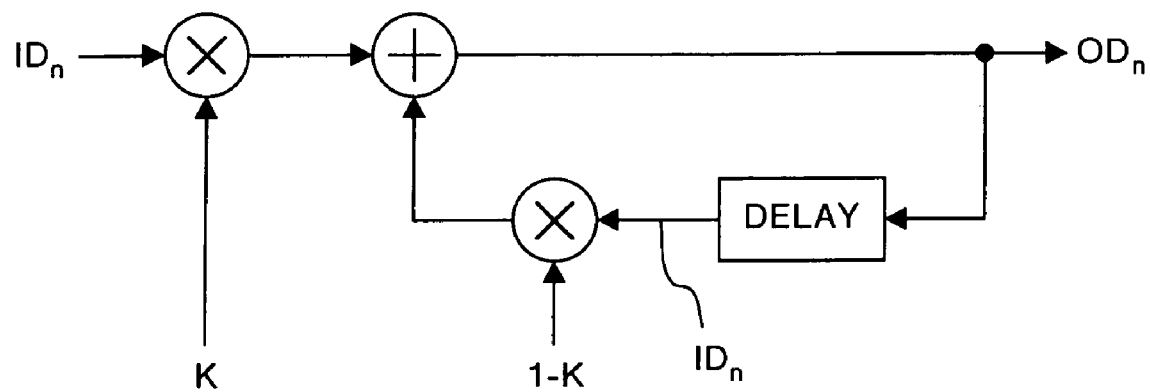
FIG. 5 is an explanatory view concretely showing the operation of an auxiliary operation processing section shown in FIG. 3.

FIG. 5 is an explanatory view for specifically describing such auxiliary operation processing sections. In this embodiment, the auxiliary operation processing section 309a (or the auxiliary operation processing section 309b) has an IIR type filter system constitution. As shown therein, an operation expression used by the IIR type filter is represented as follows:

$$Odn=(1-K) \times ODn-1+K \cdot IDn \qquad (1)$$

ODn: pixel density after operation,
ODn−1: operation result using one pixel data before the current pixel data, and
IDn: current pixel data.

As is obvious from the expression (1) and FIG. 5, the density ODn after operation is obtained from the value of the operation result ODn−1 using one pixel data before the current pixel data and the value of the current pixel data IDn. Normally, the IIR type filter is an exclusive circuit for conducting an operation with respect to a current pixel using an operation result obtained by using a pixel which has been processed before the current pixel, i.e., for conducting so-called consecutive conversion. In case of the image processing apparatus in this embodiment, each of the two auxiliary operation processing sections 309a and the 309b has the IIR type filter constitution, and conducts an image processing while associating with the SIMD type data operation processing section 300.

The auxiliary operation processing sections 309a and 309b conduct an image processing in association with the data operation processing section 300, whereby the image processor 204 can conduct a complicated image processing at high speed. Further, by providing a plurality of auxiliary operation processing sections, it is possible to simultaneously execute image processing operations disadvantageous to the non-SIMD type auxiliary operation processing section, to a plurality of items of image data. As a result, the image processing apparatus in this embodiment can realize a multifunctional operation for simultaneously conducting operations as, for example, a copying machine and a facsimile machine.

On the other hand, the data operation processing section 300 is provided with a memory section which includes a CPU (not shown) executing an operation processing, an ROM storing a program and the like used for the operation processing of the CPU and an RAM storing an operation result. The data operation processing section 300 has registers R0 to R23 serving as data interfaces between the processor elements (PE's) of the CPU and an external side.

Among these registers, the registers R0 to R19 are divided into a block consisting of the registers R0 to R5, a block consisting of the registers R6 and R7, a block consisting of the registers R8 to R13 and a block consisting of the registers R14 to R19.

The registers R0 to R5 are used by the memory controllers 305b connected to the memory switch 301a. The registers R6 and R7 are used by the memory controllers 305b connected to the memory switch 301b.

The registers R8 to R13 are used by the memory controllers 305b and 305a connected to the memory switch 301c. The registers R14 to R19 are used by the memory controllers 305a connected to the memory switch 301d. Further, the registers R20 and R21 are used by the auxiliary operation processing section 309a, and the registers R22 and R23 are used by the auxiliary operation processing section 309b.

Moreover, the bus switch 302a is connected to the memory controllers 305b using the registers R0 to R3 of the data operation processing section 300. The bus switch 302b is connected to the memory controllers 305b using the registers R4 and R5. The bus switch 302c is connected to the memory controllers 305b using the registers R6 to R9.

The image processor 204 constituted as stated above operate as follows according to a program stored in the SIMD type operation processing section 300. The image processor 204 in this embodiment inputs control signals as well as image data from the image data control section 203 through the data input/output buses 306a, 306b, 306c, 306d and 306e.

The control signals and the image data are inputted into the memory controllers 305a and 305b through the bus switches 302a, 302b and 302c. The control signals and the image data are then inputted from the memory controllers 305a and 305b into the CPU of the data operation processing section 300 through the registers R0 to R13.

Meanwhile, a memory section included in the data operation processing section 300 stores connection modes of the RAM's 307 suited for the operation modes of the image processing apparatus such as a copying machine and a facsimile machine. The CPU judges an operation mode based on the control signals inputted therein to together with the image data or based on the register number which register inputs the image data into the CPU, and selects a connection mode of the RAM's 307 suited for this operation mode. Then, the CPU sets a predetermined value for controlling the memory controllers to the respective registers so that the RAM's 307 can connect to the data operation processing section 300 in accordance with this selected operation mode.

The memory controllers 305a and 305b refer to the value and generate control signals for the memory switches 301a, 301b and 301c connected thereto, respectively. The memory switches 301a, 301b and 301c selectively connect a plurality of RAM'S 307 to the data operation processing section 300 in accordance with the control signals. The capacities of the RAM's 307 which use the respective registers are changed, thereby changing the memory capacities allotted to the respective image formation operations.

Further, the memory section included in the CPU of the data operation processing section 300 in this embodiment stores connection modes of the data input/output buses 306a, 306b, 306c, 306d and 306e connected by the bus switches 302a, 302b and 302c suited for the operation mode of the image processing apparatus.

The CPU judges an operation mode based on the control signals inputted thereinto together with the image data or based on the register number which register has inputted the image data, and selects the connection mode of the bus switches 302a, 302b and 302c suited for this operation mode thus judged. Then, the CPU sets a predetermined value for controlling the memory controllers to the respective registers so that the bus switches 302a, 302b and 302c can switch over the data input/output buses 306a, 306b, 306c, 306d and 306e in accordance with the selected connection mode.

The memory controllers 305a and 305b refer to this value and generate and output control signals for the bus switches 302a, 302b and 302c either directly or through the memory switches 301a, 301b and 301c. The bus switches 302a, 302b and 302c control the data input/output buses 306a, 306b, 306c, 306d and 306e in accordance with the control signals, and change the data transfer widths (bus widths) of the data. input/output buses 306a, 306b, 306c, 306d and 306e for the respective registers. By conducting this processing, the bus widths of the image data input/output buses allotted to the respective image formation operations are changed.

Now, the RAM connection modes and the bus switch connection modes as stated above will be described specifically.

RAM Connection Modes:

Description will be given hereinafter while assuming that RAM connection modes in this embodiment are:

(1) a connection mode at the switches 301a, 301c and 301d, and (2) a connection mode at the memory switch 301b.

(1) FIG. 6 shows the connection modes of the RAM's 307 at the memory switches 301a, 301c and 301d except for the memory switch 301b among the memory switches 301a to 301d. As shown in FIG. 6, each of the memory switches 301a, 301c and 301d in this embodiment has seven connection modes, i.e., modes A to G. All the memory switches 301a, 301c and 301d have the same connection modes. Due to this, description will be given only to the memory switch 301a and no description will be given to the memory switches 301c and 301d.

Mode A:

In mode A, six memory controllers 305b connected to the registers R0 to R5 and the memory switch 301a are employed while dividing them into three groups each consisting of two memory controllers. The respective groups of memory controllers 305b are connected to the two RAM's 307. In the mode A, the RAM's 307 connected to the respective groups (group of R0 and R1, group of R2 and R3 and group of R4 and R5) can be used by one of the following three methods, i.e., one RAM 307 is normally accessed (a 1-RAM normal access mode) two RAM's 307 are used as one storage region and alternately accessed (toggle-accessed) (a 1-RAM toggle access mode); and two RAM's 307 are normally accessed (a 2-RAM normal access mode).

It is note that the designation of toggle access is made by writing an RAM toggle command bit when the data operation processing section 300 set a predetermined value for controlling the memory controllers to the respective registers. Combinations of access methods for such groups of RAM's 307 are represented by FIG. 7.

To be specific, if the RAM's 307 using the registers R0 and R1 are set at the 1-RAM normal access mode, for example, the memory switch 301a connects one RAM 307 to each of the registers R0 and R1. Each of the connected RAM's 307 functions as one storage region used when the data operation processing section 300 conducts an image processing.

Further, if the RAM's 307 using the registers R0 and R1 are set at the 1-RAM toggle access mode, the memory switch 301a connects two RAM's 307 to the register R0. The RAM's 307 both connected to the register R0 are alternately switched over by the memory controllers 305b and 301a, and function as one storage region used when the data operation processing section 300 conducts an image processing.

Further, if the two RAM's 307 using the registers R0 and R1 are set at the 2-RAM normal access mode, each RAM 307 functions in the same manner as that of the RAM connected to the register R0. Accordingly, in the 2-RAM normal access mode, it is possible to obtain the same advantage as that obtained when one register uses an RAM having a storage capacity twice as high as that of the 1-RAM normal access mode.

In the modes B to G, combinations of six RAM's 307 connected to the data operation processing section 300 through the memory controllers 305b and the memory switch 301a are switched over, thereby changing the capacities of the RAM's 307 connected to the data operation processing section 300.

Mode B:

In mode B, as shown in FIG. 6, the register R0 is used by the two RAM's 307. The memory switch 301a connects the two RAM's to the register R0 and sets the RAMS at the 2-RAM normal access mode. Further, the registers R1 and R3 are used by one RAM 307, respectively. Each RAM 307 is set at the 1-RAM normal access mode. The two RAM's 307 using registers R4 and R5 are set at the 1-RAM normal access mode, the 2-RAM normal access mode or the 1-RAM toggle mode according to the combination shown in FIG. 6.

Mode C:

In mode C, as shown in FIG. 6, the register R0 is used by the four RAM's 307. The memory switch 301a divides the four RAM's 307 into two groups each consisting of two RAM's and connects the RAM's 307 to the register R0 so that each group of the RAM's 307 are toggle-accessed (2-RAM toggle mode). Further, the two RAM's 307 using the registers R4 and R5 are set at the 1-RAM normal access mode, the 2-RAM normal access mode or the 1-RAM toggle mode according to the combination shown in FIG. 6.

Mode D:

In mode D, as shown in FIG. 6, the register R0 is used by three RAM's 307. The memory switch 301a connects each of the three RAM's 307 to the register R0 so that each RAM can be normally accessed by the register R0 (3-RAM normal access mode). This method allows the mode D to obtain the same advantage as that if an RAM having a storage region three times as large as that of the RAM's 307 is connected to the register R0.

In the mode D, as shown in FIG. 6, the registers R2 and R3 are used by the two RAM's 307. The memory switch 301*a* connects the RAMS 307 to the registers R2 and R3 so that the RAM's are set at the 1-RAM normal access mode, the 2-RAM normal access mode or the 1-RAM toggle mode according to the combination shown in FIG. 6. Further, the register R4 is used by one RAM 307, which RAM is set at the 1-RAM normal access mode.

Mode E:

In mode E, as shown in FIG. 6, the register R0 is used by the three RAM's 307. The memory switch 301*a* connects the three RAM's 307 to the register R0 so that the RAM's are set at the 3-RAM normal access mode. Each of the registers R1, R3 and R4 is used by one RAM 307, which RAM is set at the 1-RAM normal access mode.

Mode F:

In mode F, as shown in FIG. 6, each of the registers R0 and R2 is used by three RAM's 307. The memory switch 301*a* sets the three RAM's 307 at the 3-RAM normal access mode.

Mode G:

In mode G, as shown in FIG. 6, the register R0 is used by six RAM's 307. The memory switch 301*a* divides the six RAM's 307 into three groups each consisting of two RAM's and connect the three RAM's 307 to the register R0 so that each group of RAM's 307 can be toggle-accessed (3-RAM toggle mode).

(2) FIG. 8 shows connection modes of the RAM's 307 at the memory switch 301*b*. As shown in FIG. 8, the memory switch 301*b* in this embodiment has three connection modes, i.e., modes H to J. The memory controller 305*b* connected to the memory switch 301*b* uses the registers R6 and R7 of the data operation processing section 300.

Mode H:

In mode H, as shown in FIG. 8, each of the registers R6 and R7 is used by one RAM 307. The memory switch 301*b* sets the RAM's 307 at the 1-RAM normal access mode.

Mode I:

In mode I, as shown in FIG. 8, the register R6 is used by the two RAM's 307. The memory switch 301*b* sets the RAM's 307 at the 1-RAM toggle access mode.

Mode J:

In mode J, as shown in FIG. 8, the register R6 is used by the two RAM's 307. The memory switch 301*b* sets the RAM's 307 at the 2-RAM normal access mode.

As stated above, in this embodiment, the capacities of the RAM's 307 used by the respective registers of the data operation processing section 300 are changed. By changing the capacities, it is possible to change the capacities of the RAM's 307 allotted for the image processing operation modes conducted by using the respective registers. According to the processing, many RAM's 307 are allotted to an operation mode requiring relatively a high storage capacity for image processing, while fewer RAM's 307 are allotted to an operation mode which requires a relatively low storage capacity for image processing.

Therefore, in the embodiment stated so far, in the programmable image processing apparatus capable of realizing a plurality of operation modes, it is possible to optimally combine RAM's 307 according to the operation modes and to effectively utilize the RAM's provided in the image processing apparatus.

Data Input/Output Bus Connection Modes:

Next, description will be given while assuming that data input/output bus connection modes in this embodiment are:

(1) a connection mode at the bus switches 302*a* and 302*c*, and (2) a connection mode at the bus switch 302*b*.

(1) FIG. 9 shows data bus connection modes at the bus switches 302*a* and 302*c* among the bus switches 302*a* to 302*c*. As shown in FIG. 9, each of the bus switches 302*a* and 302*c* in this embodiment has eleven connection modes, i.e., modes K to U. Both of the bus switches 302*a* and 302*c* have the same connection modes. Therefore, description will be given only to the bus switch 302*a* and no description will be given to the bus switch 302*c*. It is noted that the following description relate to the image data input/output at the data input/output buses 306*a* and 306*b*.

The bus switch 302*a* is connected to the data input/output buses 306*a* and 306*b*. The interfaces between the data input/output buses 306*a* and 306*b* and the PE's of the data operation processing section 300 are made by the registers R0 to R3 of the data operation processing section 300. All of the registers R0 to R3 have a data transfer width of 8 bits. Due to this, if data is inputted/outputted between the bus switches 302*a*, 302*c* and the PE's, the inputted/outputted data are converted into 8-bit data through the memory controllers 305*b*.

Mode K:

In mode K, as shown in FIG. 9, the bus switch 302*a* connects the lower 8 bits and the upper 8 bits of the data input/output bus 306*a* (which is denoted by data input/output bus 0 in FIG. 9) to the registers R0 and R1, respectively. Also, the bus switch 302*a* connects the lower 8 bits and the upper 8 bits of the data input/output bus 306*b* (which is denoted by data input/output bus 1 in FIG. 9) to the registers R2 and R3, respectively.

Mode L:

In mode L, as shown in FIG. 9, the bus switch 302*a* connects the lower 8 bits and the upper 8 bits of the data input/output bus 306*a* (which is denoted by data input/output bus 0 in FIG. 9) to the registers R0 and R1, respectively. Also, the bus switch 302*a* connects the lower 8 bits and the upper 8 bits of the data input/output bus 306*b* (which is denoted by data input/output bus 1 in FIG. 9) to the register R2.

Mode M:

In mode M, as shown in FIG. 9, the bus switch 302*a* connects the lower 8 bits and the upper 8 bits of the data input/output bus 306*a* (which is denoted by data input/output bus 0 in FIG. 9) to the registers R0 and R1, respectively. Also, the bus switch 302*a* connects the lower 8 bits and the upper 8 bits of the data input/output bus 306*b* (which is denoted by data input/output bus 1 in FIG. 9) to the register R3.

Mode N:

In mode N, as shown in FIG. 9, the bus switch 302*a* connects the lower 8 bits and the upper 8 bits of the data input/output bus 306*a* (which is denoted by data input/output bus 0 in FIG. 9) to the register R0. Also, the bus switch 302*a* connects the lower 8 bits and the upper 8 bits of the data input/output bus 306*b* (which is denoted by data input/output bus 1 in FIG. 9) to the registers R2 and R3, respectively.

Mode O:

In mode O, as shown in FIG. 9, the bus switch 302*a* connects the lower 8 bits and the upper 8 bits of the data input/output bus 306*a* (which is denoted by data input/output bus 0 in FIG. 9) to the register R0. Also, the bus switch 302*a* connects the lower 8 bits and the upper 8 bits of the data input/output bus 306b (which is denoted by data input/output bus 1 in FIG. 9) to the register R2.

Mode P:

In mode P, as shown in FIG. 9, the bus switch 302a connects the lower 8 bits and the upper 8 bits of the data input/output bus 306a (which is denoted by data input/output bus 0 in FIG. 9) to the register R0. Also, the bus switch 302a connects the lower 8 bits and the upper 8 bits of the data input/output bus 306b (which is denoted by data input/output bus 1 in FIG. 9) to the register R3.

Mode Q:

In mode Q, as shown in FIG. 9, the bus switch 302a connects the lower 8 bits and the upper 8 bits of the data input/output bus 306a (which is denoted by data input/output bus 0 in FIG. 9) to the register R1. Also, the bus switch 302a connects the lower 8 bits and the upper 8 bits of the data input/output bus 306b (which is denoted by data input/output bus 1 in FIG. 9) to the registers R2 and R3, respectively.

Mode R:

In mode R, as shown in FIG. 9, the bus switch 302a connects the lower 8 bits and the upper 8 bits of the data input/output bus 306a (which is denoted by data input/output bus 0 in FIG. 9) to the register R1. Also, the bus switch 302a connects the lower 8 bits and the upper 8 bits of the data input/output bus 306b (which is denoted by data input/output bus 1 in FIG. 9) to the register R2.

Mode S:

In mode S, as shown in FIG. 9, the bus switch 302a connects the lower 8 bits and the upper 8 bits of the data input/output bus 306a (which is denoted by data input/output bus 0 in FIG. 9) to the register R1. Also, the bus switch 302a connects the lower 8 bits and the upper 8 bits of the data input/output bus 306b (which is denoted by data input/output bus 1 in FIG. 9) to the register R3.

Mode T:

In mode T, as shown in FIG. 9, the bus switch 302a connects the lower 8 bits and the upper 8 bits of the data input/output bus 306a (which is denoted by data input/output bus 0 in FIG. 9) and the lower 8 bits and the upper 8 bits of the data input/output bus 306b (which is denoted by data input/output bus 1 in FIG. 9) to the register R0.

Mode U:

In mode U, as shown in FIG. 9, the bus switch 302a connects the lower 8 bits and the upper 8 bits of the data input/output bus 306a (which is denoted by data input/output bus 0 in FIG. 9) and the lower 8 bits and the upper 8 bits of the data input/output bus 306b (which is denoted by data input/output bus 1 in FIG. 9) to the register R1.

(2) FIG. 10 shows the connection modes of the data input/output buses 306a and 306b at the bus switch 302b. As shown in FIG. 10, the bus switch 302b in this embodiment has three connection modes, i.e., modes V to X. The bus switch 302b is connected to the data input/output bus 306c. The interfaces between the data input/output bus 306c and the PE's in the data operation processing section 300 are made by the registers R4 and R5 of the data operation processing section 300.

As for the registers R4 and R5 as in the case of the above, if data is inputted/outputted between the bus switches 302b and the PE's, the inputted/outputted data is converted into 8-bit data by the memory controllers 305b.

Mode V:

In mode V, as shown in FIG. 10, the bus switch 302a connects the lower 8 bits and the upper 8 bits of the data input/output bus 306c (which is denoted by data input/output bus 2 in FIG. 10) to the registers R4 and R5, respectively.

Mode W:

In mode W, as shown in FIG. 10, the bus switch 302a connects the lower 8 bits and the upper 8 bits of the data input/output bus 306c (which is denoted by data input/output bus 2 in FIG. 10) to the register R4.

Mode X:

In mode X, as shown in FIG. 10, the bus switch 302a connects the lower 8 bits and the upper 8 bits of the data input/output bus 306c (which is denoted by data input/output bus 2 in FIG. 10) to the register R5.

In this embodiment, the widths of the buses connected to the respective registers of the data operation processing section 300 are changed as stated above. This change processing allows bus widths allotted to the image processing operation modes conducted by using the respective registers to be changed. According to this processing, the operation mode can optimize the data transfer widths between the data input/output buses and the RAM's and can flexibly correspond to the format of data inputted/outputted in each operation mode of a plurality of operation modes.

Next, the processing procedures in this embodiment stated above will be described with reference to flow charts shown in FIG. 11, FIG. 12 and FIG. 13. The flow chart in FIG. 11 is an explanatory view for the entire processings of the RAM's and the data input/output bus connection.

Figure 11:
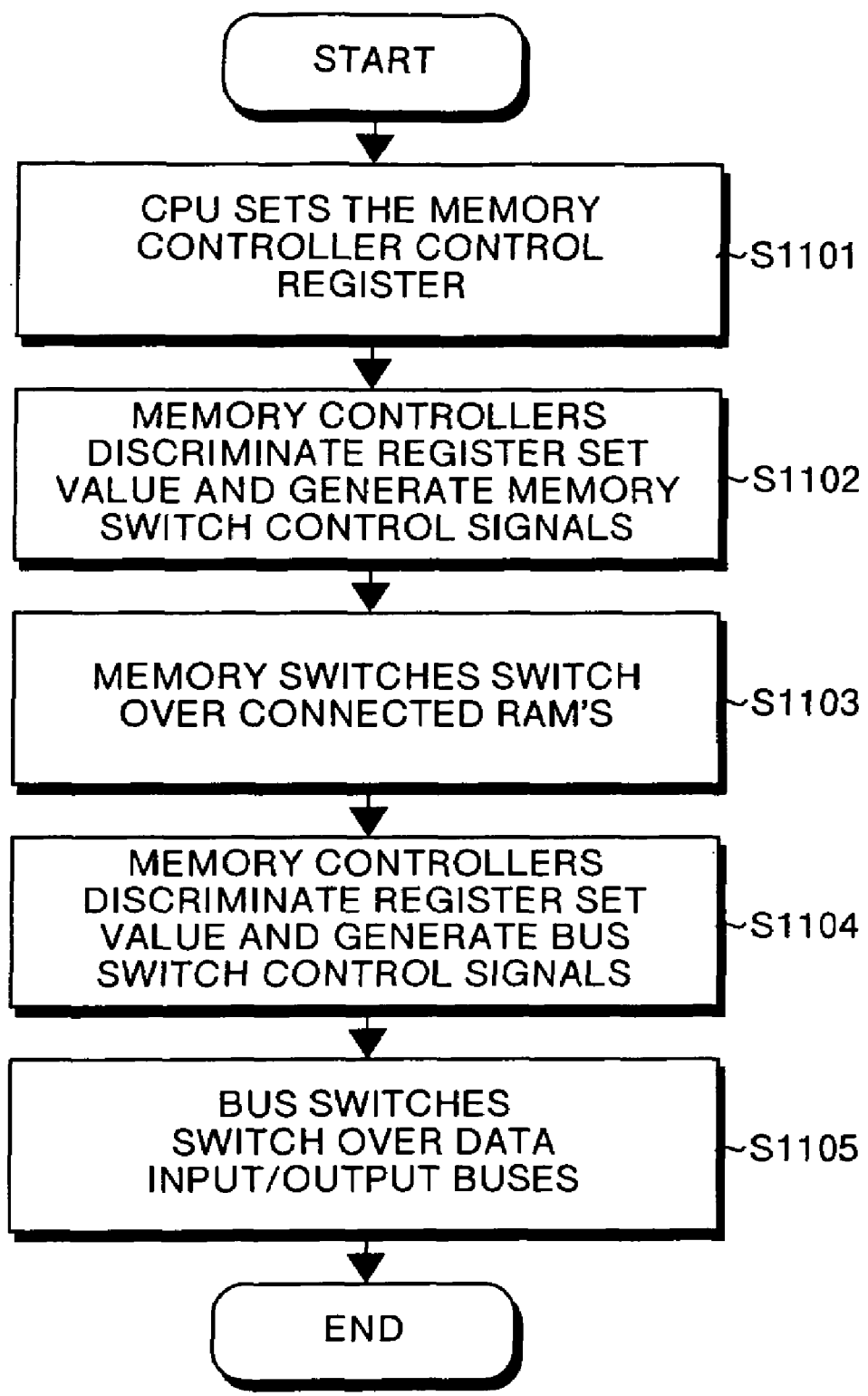
FIG. 11 is a flow chart showing all processings for RAM's and data input/output bus connection in an image processing method in the embodiment according to the present invention.
Figure 12:
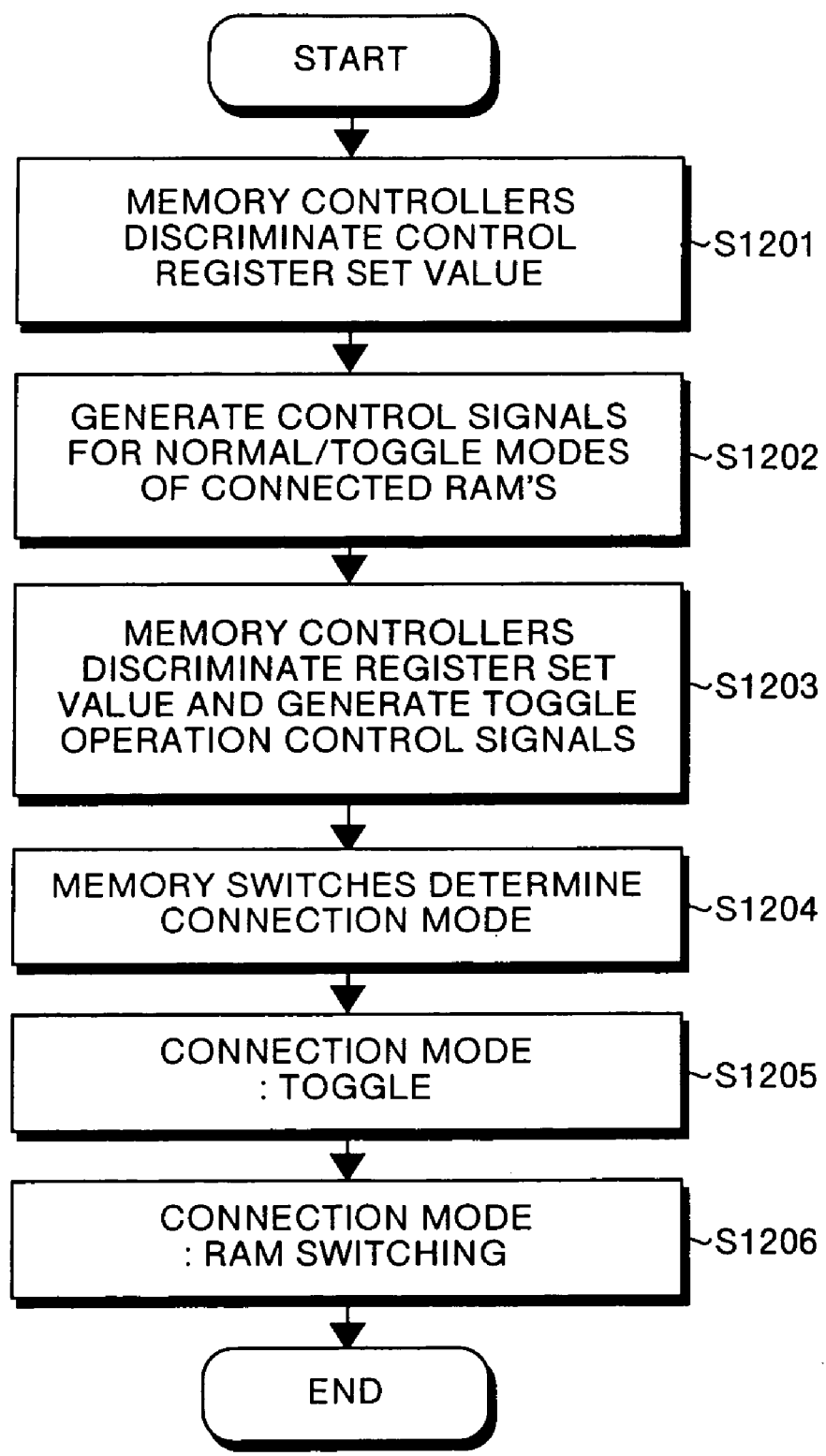
FIG. 12 is flow chart describing more concretely RAM connection processings conducted by memory controllers and memory switches in the image processing method in the embodiment according to the-present invention.

FIG. 12 is a flowchart form ore concretely describing RAM connection processings conducted by the memory controllers and memory switches in the processing shown in FIG. 11. FIG. 13 is a flow chart for more concretely describing data input/output bus connection processings conducted by the memory controllers and the bus switches.

In the flow chart of FIG. 11, first, the CPU of the data operation processing section 300 sets a memory controller control value at the respective registers (in a step S1101). The memory controller 305a or 305b discriminates the set value set to the registers in the step S1101 and generates control signals for controlling the memory switches 301a, 301b and 301c (in a step S1102). The memory switches 301a, 301b and 301c switch over the RAMS 307 connected to the respective switches in accordance with the control signals generated in the step S1102 (in a step S1103).

The memory controller 305a or 305b discriminates the set value set to the registers in the step S1101, and generate control signals for controlling the bus switches 302a, 302b and 302c (in a step S1104). The bus switches 302a, 302b and 302c switch over the data input/output buses 306a, 306b, 306c, 306d and 306e connected to the respective switches in accordance with the control signals generated in the step S1102 (in a step S1105) and a series of processings are finished.

Further, as shown in the flow chart of FIG. 12, the memory controllers 305a and 305b discriminate the set value set to the memory controller control registers among the respective registers of the data operation processing section 300 (in a step S1201). Based on the set value, the memory controllers 305a and 305b are connected to the respective registers and generate normal/toggle control signals indicating whether the RAM's 307 using the registers are normal accessed or toggle-accessed (in a step S1202) In addition, based on the discriminated set value set to the registers, the memory controllers 305a and 305b generates a toggle operation control signal for toggle-controlling the RAM 307 set in the toggle access mode (in a step S1203).

The normal/toggle control signals and the toggle operation control signals are inputted into the memory switches 301a, 301b and 301c. The memory switches 301a, 301b and 301c determine the connection mode of the RAM's 307 from these control signals (in a step S1204). The memory switches 301a, 301b and 301c switch over the RAM's 307 to be toggle-operated to execute the toggle operations according to the connection mode (in a step S1205), and connect or disconnect (switch over) the RAM's 307 to/from the respective registers of the data operation processing section 300 according to the connection mode, thereby separating the storage region (in a step S1206).

Moreover, as shown in the flow chart of FIG. 13, the memory controllers 305a and 305b discriminate the set value of the memory controller control registers among the respective registers of the data operation processing section 300 (in a step S1301), and generate bus switch control signals controlling the bus switches 302a, 302b and 302c based on the discrimination result (in a step S1302).

The bus switch control signals are inputted into the bus switches 302a, 302b and 302c. The bus switches 302a, 302b and 302c determine the connection mode of the data input/output buses 306a, 306b and 306c based on the bus switch control signals (in a step S1303), and connect or disconnect (switch over) the data input/output buses 306a, 306b, 306c to/from the respective registers of the data operation processing section 300 according to the connection mode (in a step S1304).

The image processing method which has been described in this embodiment is realized by allowing a computer to execute a program prepared in advance. This program is recorded on a computer-readable recording medium such as a hard disk, a floppy disk, a CD-ROM, an MO or a DVD, and executed after the computer reads the program from the recording medium. In addition, the program can be distributed through the recording medium or through a network such as the Internet as a transmission medium.

As stated so far, according to the invention recited in the first aspect, an image processing apparatus capable of simultaneously executing an image processing among a plurality of image formation operations to a plurality of items of data can be advantageously obtained.

According to the invention recited in the second aspect, a memory capacity used is changed for every image formation operation conducted by the image processing apparatus, thereby making it possible to effectively utilize memories while flexibly corresponding to a data format used for every image formation operation. Thus, an image processing apparatus capable of optimally controlling an overall system can be advantageously obtained.

According to the invention recited in the third aspect, an image data transfer width is changed for every image formation operation conducted by the image processing apparatus, thereby making it possible to effectively utilize memories while flexibly corresponding to a data format used for every image formation operation. Thus, an image processing apparatus capable of optimally controlling an overall system can be advantageously obtained.

According to the invention recited in the fourth aspect, one image processing apparatus can be provided with both a SIMD type operation unit and an non-SIMD type operation unit. Thus, an image processing apparatus capable of optimally controlling an overall system can be advantageously obtained.

According to the invention recited in the fifth aspect, a memory capacity is changed for every image formation operation, thereby making it possible to effectively utilize memories while flexibly corresponding to a data format used for every image formation operation. Thus, an image processing apparatus capable of optimally controlling an overall system can be advantageously obtained.

According to the invention recited in the sixth aspect, an image data transfer width is changed for every image formation operation, thereby making it possible to effectively utilize data input/output buses while flexibly corresponding to a data format used for every image formation operation. Thus, an image processing apparatus capable of optimally controlling an overall system can be advantageously obtained.

According to the invention recited in the seventh aspect, the recording medium records a program for allowing a computer to execute the method recited in the fifth and sixth aspects, thereby making it possible to mechanically read the program. Thus, the operations recited in the fifth and sixth aspects can be advantageously realized by the computer.

The present document incorporates by reference the entire contents of Japanese priority documents, 11-353974 filed in Japan on Dec. 14, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   an image processing unit which processes image data, the image data represented by a digital signal generated based on an image, and allows realization of a plurality of image formation operations; and
   an image data transmission management unit which manages a transmission of the image data between a data bus transmitting the image data and said image processing unit used for the image processing,
   wherein said image processing unit includes:
   a data operation unit;
   a plurality of memories used for the image processing conducted by said data operation unit;
   a plurality of memory controllers configured to control said plurality of memories;
   a memory switch configured to selectively connect said plurality of memories with said data operation unit;
   a plurality of data buses configured to input and output the image data; and
   a bus switch configured to control a connection between said plurality of data buses and said data operation unit.

2. The image processing apparatus according to claim 1, wherein said plurality of memory controllers and said memory switch selectively connect at least one of said plurality of memories to said data operation unit, and thereby change a memory capacity allotted to each image formation operation among the plurality of image formation operations.

3. The image processing apparatus according to claim 1, wherein said plurality of memory controllers and said memory switch control said plurality of data buses and change an image data transfer width allotted to each image formation operation among the plurality of image formation operations.

4. An image processing apparatus comprising:
   an image processing means for processing image data, the image data represented by a digital signal generated based on an image, and allows realization of a plurality of image formation operations; and
   an image data transmission management means for managing a transmission of the image data between a data bus transmitting the image data and said image processing means used for the image processing conducted by said image processing means, wherein said image processing means includes:
- a data operation means;
- a plurality of memories used for the image processing conducted by said data operation means;
- a plurality of memory controllers controlling said plurality of memories;
- a memory switch selectively connecting said plurality of memories with said data operation means;
- a plurality of data buses for inputting and outputting the image data; and
- a bus switch controlling connection between said plurality of data buses and said data operation means.

5. The image processing apparatus according to claim 4, wherein said plurality of memory controllers and said memory switch selectively connect at least one of said plurality of memories to said data operation means, and thereby change a memory capacity allotted to each image formation operation among the plurality of image formation operations.

6. The image processing apparatus according to claim 4, wherein said plurality of memory controllers and said memory switch control said plurality of data buses and change an image data transfer width allotted to each image formation operation among the plurality of image formation operations.

7. An image processing method for processing image data represented by a digital signal based on an image configured to output the image data on a image processing unit, the image processing unit comprising:
- a data operation unit,
- a plurality of local memories used for an image processing conducted by the data operation unit,
- a plurality of memory controllers configured to control the plurality of local memories, and
- a memory switch configured to control a connection of the plurality of local memories, and configured to allow a plurality of image formation operations, the method comprising the step of:
selectively connecting the plurality of local memories to said data operation unit by using the plurality of memory controllers and the memory switch thereby changing a memory capacity allotted to each image formation operation among the plurality of image formation operations.

8. An image processing method for processing image data represented by a digital signal based on an image configured to output the image data on a image processing unit, the image processing unit comprising:
- a data operation unit,
- a plurality of memories used for an image processing conducted by the data operation unit,
- a plurality of memory controllers configured to control the plurality of memories,
- a memory switch configured to selectively connect the plurality of memories with said data operation unit,
- a plurality of data buses configured to input and output the image data, and
- a bus switch configured to control a connection between the plurality of data buses and the data operation unit,
the method comprising:
controlling said plurality of data buses and said plurality of memories by using said plurality of memory controllers and said bus switch thereby changing an image data transfer width allotted to each image formation operation among the plurality of image formation operations.

9. A computer readable medium for storing instructions, which when executed by a computer, causes the computer to perform an image processing method for processing image data represented by a digital signal based on an image configured to output the image data on a image processing unit, the image processing unit comprising:
- a data operation unit,
- a plurality of local memories used for an image processing conducted by the data operation unit,
- a plurality of memory controllers configured to control the plurality of local memories, and
- a memory switch configured to control a connection of the plurality of local memories, and configured to allow a plurality of image formation operations, the method comprising:
selectively connecting the plurality of local memories to said data operation unit by using the plurality of memory controllers and the memory switch thereby changing a memory capacity allotted to each image formation operation among the plurality of image formation operations.

10. A computer readable medium for storing instructions, which when executed by a computer, causes the computer to perform an image processing method for processing image data represented by a digital signal based on an image configured to output the image data on a image processing unit, the image processing unit comprising
- a data operation unit,
- a plurality of memories used for an image processing conducted by the data operation unit,
- a plurality of memory controllers configured to control the plurality of memories,
- a memory switch configured to selectively connect the plurality of memories with said data operation unit,
- a plurality of data buses configured to input and output the image data, and
- a bus switch configured to control a connection between the plurality of data buses and the data operation unit,
the method comprising:
controlling said plurality of data buses and said plurality of memories by using said plurality of memory controllers and said bus switch thereby changing an image data transfer width allotted to each image formation operation among the plurality of image formation operations.

11. An image processing method according to claim 7, wherein said data operation unit does not access an external memory outside of the image processing unit.

12. A computer readable medium for storing instructions according to claim 9, wherein said data operation unit does not access an external memory outside of the image processing unit.

13. An image processing apparatus according to claim 1, wherein said bus switch is configured to change a bus width of said plurality of data buses allotted to said image formation operation executed in said data operation unit.

14. An image processing apparatus according to claim 4, wherein said bus switch is configured to change a bus width of said plurality of data buses allotted to said image formation operation executed in said data operation means.

15. An image processing apparatus according to claim 1, wherein said memory switch is configured to adapt a data format for said image data processed by said data operation unit.

16. An image processing apparatus according to claim 4, wherein said memory switch is configured to adapt a data format for said image data processed by said data operation means.

* * * * *